United States Patent [19]

Nomura et al.

[11] Patent Number: 4,600,587
[45] Date of Patent: Jul. 15, 1986

[54] PROCESS OF MANUFACTURING FROZEN DOUGH OF YEAST-FERMENTED DOUGH

[75] Inventors: Satoshi Nomura, Tokorozawa; Shinji Ishigami, Tanashi, both of Japan

[73] Assignee: Nisshin Flour Milling Co., Ltd., Japan

[21] Appl. No.: 707,061

[22] Filed: Mar. 1, 1985

Related U.S. Application Data

[63] Continuation-in-part of Ser. No. 563,574, Dec. 20, 1983, abandoned.

[30] Foreign Application Priority Data

Jan. 28, 1985 [JP] Japan ................................. 60-12638

[51] Int. Cl.⁴ .............................................. A21D 8/00
[52] U.S. Cl. ..................................... 426/19; 426/504
[58] Field of Search ................... 426/19, 24, 601, 602, 426/654

[56] References Cited

U.S. PATENT DOCUMENTS 1,750,720  3/1930  Matti .................................... 426/19
3,566,807  3/1971  Blanchard ............................ 426/19
3,785,993  2/1974  Langhans ............................ 426/654
4,406,911  9/1983  Larson et al. ........................ 426/19

FOREIGN PATENT DOCUMENTS 482161  3/1975  U.S.S.R. .............................. 426/19

OTHER PUBLICATIONS

Daniel, Bakery Materials and Methods, 4th Ed. published by Maclaren & Sons Ltd., London 1963 pp. 92–94.
Marston, "American Society of Bakery Engineers" Bulletin No. 213, Frozen Dough for Breakmaking.

Primary Examiner—Raymond N. Jones
Assistant Examiner—Elizabeth A. King
Attorney, Agent, or Firm—Abelman Frayne Rezac & Schwab

[57] ABSTRACT

Disclosed is a process of producing a frozen yeast fermented dough which involves first emulsifying the total amount of water required for the dough with fat or oil before mixing with other dough ingredients.

4 Claims, No Drawings

PROCESS OF MANUFACTURING FROZEN DOUGH OF YEAST-FERMENTED DOUGH

This is a continuation-in-part of U.S. Ser. No. 563,574, filed Dec. 20, 1983, now abandoned.

BACKGROUND OF THE INVENTION

1. Field of Invention

This invention relates to a process of producing a frozen yeast fermented dough for a bread, a yeast doughnut and the like.

2. Description of Prior Art

Demand for the frozen yeast fermented dough has been increasing in recent years with rationalization of a breadmaking factory.

Hitherto, yeast fermented doughs have been generally prepared according to the straight dough method and the sponge dough method. The straight dough method comprises mixing together the whole amount of wheat flour, water having yeast dissolved therein, yeast food, and other ingredients than oil or fat to a considerable extent, adding oil or fat to a mixture, thoroughly mixing the ingredients to prepare a dough, after which the dough is subjected to fermenting, dividing, benching, molding, final proofing and baking. The sponge dough method comprises adding to a part of wheat flour the whole amounts of yeast and yeast food and a part of water, mixing them together to prepare a sponge dough, fermenting the dough, adding to a fermented dough the remaining wheat flour, other ingredients than oil or fat and the remaining water, mixing the dough to a considerable extent followed by addition of oil or fat, thoroughly mixing the ingredients to prepare a dough, giving the dough to a floor time, and dividing, after which the subsequent steps are performed in accordance with the straight sponge method.

However, the frozen doughs produced by the aforedescribed two methods suffer from the disadvantages of a deterioration in the quality of the baked product, which is due to the remarkable reduction in fermentation activity and the associated degradation of the dough which are considered to be caused by the formation of alcohol during fermentation of the dough, thus strongly damaging yeast cells upon freezing. Now, a modified straight dough method has been employed hitherto for producing the frozen yeast fermented dough. In the modified method, the same operations as employed in the straight dough method are performed up to the preparation of a dough, and subsequently the dough is not fermented at all or fermented for a short time to the extent of 1/10 as compared to the straight dough method, after which the fermented dough is subjected to dividing, benching, molding, freezing, thawing, proofing, and baking. However, the modified straight dough method has serious disadvantages that the prolonged frozen storage (about three weeks) of the dough gives rise to a reduction in the quality of the baked product and the length of time over a period of from thawing to final proof.

SUMMARY OF THE INVENTION

Now, we have made extensive studies in an effort to overcome the above disadvantages of the prior arts and found that such disadvantages are based on a major ground of any hindrance occurring in the structure of the dough, in addition to a ground of the reduction in yeast activity which has been considered hitherto. More particularly, we have found that when water present in the dough forms an ice crystal during freezing, an expanded volume of the ice crystal will injure the network of gluten structure to weaken it. This invention is based on the above finding and is characterized by preliminarily treating water required for a dough formulation with oil or fat and a nonionic emulsifier to enhance a frozen shelf life to the frozen dough.

An object of this invention is to provide a process of producing a frozen yeast fermented dough having excellent frozen shelf life and improved quality of baked product even after prolonged period of frozen storage. Another object of this invention is to provide a saved energy and rationalized work by shortening the length of time over a period from start of thawing to completion of final proof. Further object of this invention is to make it possible to apply to the production of the frozen dough the prior straight dough and sponge dough methods which have not been suitable therefor. Other objects, features and advantages of this invention will be apparent from the following detailed description and appended claims.

To achieve the above objects, the present invention is to preliminarily treat water required for a dough formulation wih oil or fat and a nonionic emulsifier to keep a treated solution in the form of a perfect emulsion in the dough, whereby the ice crystals forming in the dough during freezing become small and do not injure the network structure of gluten with the result of providing a longer frozen shelf life to the dough.

According to the invention, there is provided a process of producing a frozen yeast fermented dough which comprises the steps of:

(a) treating a toal amount of water required for a dough formulation with oil or fat required for the dough in the presence of a nonionic emulsifier having the HLB value of 6 to 17 and at a temperature of about 25° to 50° C., (b) mixing a treated solution with the rest of ingredients of the dough formulation to prepare a dough, (c) fermenting the dough, (d) dividing a fermented dough, (e) molding each portion of the fermented dough into the desired shape, and (f) freezing the dough to prepare a frozen dough.

DESCRIPTION OF THE INVENTION

The dough formulation of the invention includes the usual dough ingredients (except for the emulsifier) which have been used for the prior yeast fermented dough, e.g., wheat flour, yeast, yeast food, sugars such as monosaccharides or polysaccharides (e.g., glucose, fructose, sucrose, lactose, rice syrup, isomerized sugar), salt, oil or fat (e.g., butter, margarine, salad oil, shortening), eggs, dairy products (e.g., cow's milk, whole milk powder, skim milk powder, condensed milk), water and the like. The amounts of the above ingredients used are substantially the same as those used in the prior yeast fermented dough.

In the present invention, water required for the dough formulation is not mixed as it is, with the dough ingredients (except for oil or fat), but should be preliminarily treated with oil or fat and a nonionic emulsifier having the HLB value of 6 to 17 at a temperature of about 25° to 50° C. Any of nonionic emulsifiers for foodstuffs can be used which have the HLB value of 6 to 17, preferably 7 to 15, sucrose fatty acid esters being especially preferred. With the emulsifier having the HLB value outside the above range, there cannot be provided improved quality of baked product, e.g., the texture and taste of the bread.

Of the various properties of emulsifiers, HLB (Hydrophile-Lipophile Balance) is one of the most important. The HLB is an expression of the relative simultaneous attraction of an emulsifier for water and for oil (or for the two phases of the emulsion system being considered). The HLB value is an indication of the percentage weight of the hydrophilic portion of the molecule. If a nonionic emulsifier were 100% hydrophilic (which, of course, does not exist), it would be assigned an HLB value of 20, the factor 1/5 having been adopted because of the convenience of handling smaller numbers.

The amount of the emulsifier used is in the range of about 0.1 to 1% by weight, preferably about 0.2 to 0.8% by weight, based on the weight of wheat flour. With less than about 0.1% by weight, a perfect emulsion cannot be formed, and also improved quality of baked product cannot be desired. With more than about 1% by weight, the smell of the emulsifier becomes stronger, which may impair the product quality.

In such a water treatment as mentioned above, the other dough ingredients such as sugars, dairy product, yeast foods or the like are preferably mixed with water and oil or fat. In this case, however, wheat flour, yeast and salt must not be present during the water treatment. This is because the presence of wheat flour, yeast and salt is susceptible to provide the disadvantages that a perfect emulsion cannot be formed and yeast activity is reduced.

To promote the formation of a perfect emulsion, the water treatment is preferably performed at high speed by conventional agitation means, e.g., homogenizer, high-speed mixer, juicer, etc. Also, the water treatment is carried out at a temperature range of about 25° to 50° C. At the temperature outside the above range, a perfect emulsion is difficult to prepare, and the product is poor in quality, e.g., appearance, grain and crumb texture, and further taste and texture. When the process of the present invention is applied to the prior straight dough method, the total amount of water required for the dough formulation is preliminarily treated with oil or fat and the emulsifier. When the process of the present invention is applied to the prior sponge dough method, water is treated with oil or fat and the emulsifier in the dough mixing step.

In the production of the frozen dough according to the present invention, the treated solution is added to the rest of ingredients of the dough formulation, e.g., wheat flour, yeast and salt, in the prescribed mixing step, to prepare a dough. In the mixing step, conventional mixing method in the breadmaking is employed. The subsequent steps are somewhat changed depending on the difference in the breadmaking process. For instance, in the modified straight method which is the prior art process for producing the frozen dough, the dough thus formed may be either fermented not at all or fermented for a short time. In the conventional straight dough method, the dough thus formed is thoroughly fermented. In the conventional sponge dough method, a sponge dough is subjected to dough mixing after thorough fermentation to prepare the dough for final baking.

The dough thus prepared is subjected to the steps of fermentation, division, molding and freezing. Any process of freezing is acceptable, but rapid freezing is preferred.

The frozen doughs after frozen storage can be thawed at any desired time, led to final proof, and eventually baked (or fried in oil) to produce a final product.

The advantages provided by this invention are as follows:

The doughs are more durable in frozen storage than those by conventional methods, and the quality of the baked product e.g., appearance, grain and crumb texture are improved even after prolonged period of frozen storage. Furthermore, labor and energy are saved by shortened time from start of thawing to end of final proof. In additon, what is to be noted is that the prior straight and sponge dough methods which have been regarded to be unsuitable for the production of the frozen dough can be employed to obtain a final product in good taste and texture after baking.

This invention is further illustrated, but in no way limited by the following examples.

EXAMPLE 1

| Ingredient | Part by weight |
| --- | --- |
| Wheat flour | 100 |
| Yeast | 5 |
| Salt | 1.5 |
| Sugar | 12 |
| Margarine | 14 |
| Yeast food | 0.1 |
| Eggs | 12 |
| Skim milk powder | 2 |
| Sucrose fatty acid ester (HLB 11) | 0.5 |
| Water | 43 |

The above ingredients were processed in the following steps to prepare a frozen dough for butter rolls.

| Step | Operation |
| --- | --- |
| Water treatment | Water, margarine, sucrose fatty acid ester, eggs and sugar were stirred for 10 min. with a juicer at 7000 r.p.m., at a temperature of 35° C. |
| Mixing | A treated solution and the rest of ingredients were mixed for 2 min. at low speed and for 9 min. at medium speed. |
| Temperature of mixing | 26° C. |
| Fermentation | 30 min. at 27° C. and 78% relative humidity |
| Division | 40 g piece |
| Bench time | 15 min. |
| Molding | Degassed and rounded |
| Freezing | Rapid freezing (−40° C., 30 min.) |
| Storage | −18° C. |

EXAMPLE 2

| Ingredient | Part by weight |
| --- | --- |
| Wheat flour | 100 |
| Yeast | 5 |
| Salt | 1 |
| Sugar | 22 |
| Shortening | 12 |
| Yeast food | 0.1 |
| Eggs | 8 |
| Skim milk powder | 2 |
| Sucrose fatty acid ester (HLB 7) | 0.5 |

-continued

| Ingredient | Part by weight |
|---|---|
| Water | 48 |

The above ingredients were processed in the following steps to prepare a frozen dough for sweet bread (with red bean paste).

| Step | Operation |
|---|---|
| Water treatment | Water, shortening, eggs, sugar, yeast food, skim milk powder and sucrose fatty acid ester were stirred for 10 min. with high-speed mixer at 10000 r.p.m., at a temperature of 25° C. |
| Mixing | A treated solution and the rest of ingredients were mixed for 2 min. at low speed and for 10 min. at medium speed. |
| Temperature of mixing | 26° C. |
| Fermentation | Not excercised |
| Division | 40 g piece |
| Bench time | 20 min. |
| Molding | Stuffed with 30 g of red bean paste |
| Freezing | Rapid freezing (−40° C., 20 min.) |
| Storage | −18° C. |

EXAMPLE 3

| Ingredient | Part by weight |
|---|---|
| Wheat flour | 100 |
| Yeast | 6 |
| Salt | 1.5 |
| Isomerized sugar | 12 |
| Eggs | 15 |
| Skim milk powder | 4 |
| Margarine | 20 |
| Baking powder | 1 |
| Sucrose fatty acid ester (HLB 15) | 0.5 |
| Water | 45 |

The above ingredients were processed in the following steps to prepare a frozen dough for yeast doughnuts.

| Step | Operation |
|---|---|
| Water treatment | Water, margarine and sucrose fatty acid ester were stirred for 10 min. with a homogenizer at 6000 r.p.m., at a temperature of 45° C. |
| Mixing | A treated solution was mixed with the rest of ingredients for 2 min. at low speed and for 11 min. at medium speed. |
| Temperature of mixing | 27° C. |
| Fermentation | 15 min. |
| Sheeting | Thinned to 1 cm |
| Shaping | Circles 9 cm in diameter |
| Freezing | Rapid freezing (−40° C., 20 min.) |
| Storage | −18° C. |

EXAMPLE 4

| Ingredient | Part by weight |
|---|---|
| Wheat flour | 70 |
| Yeast | 3.5 |

-continued

| Ingredient | Part by weight |
|---|---|
| Yeast food | 0.1 |
| Glucose | 5 |
| Water | 40 |

The above ingredients were processed in the following steps (sugar-enriched sponge dough method) to prepare a sponge dough.

| Step | Operation |
|---|---|
| Mixing | 2 min at low speed and 2 min. at medium speed |
| Temperature of mixing | 24° C. |
| Sponge fermentation | 2.5 hr. (at 27° C. and 78% relative humidity) |

The sponge dough was added with the following ingredients and processed in the following steps to prepare a frozen dough for butter rolls.

| Ingredient | Part by weight |
|---|---|
| Wheat flour | 30 |
| Salt | 1.5 |
| Sugar | 10 |
| Margarine | 12 |
| Eggs | 12 |
| Skim milk powder | 2 |
| Sucrose fatty acid ester (HLB 11) | 0.5 |
| Water | 5 |

| Step | Operation |
|---|---|
| Water treatment | Water, margarine and sucrose fatty acid ester were stirred for 10 min. with a juicer at 7000 r.p.m., at a temperature of 35° C. |
| Mixing | A treated solution and the rest of ingredients were mixed with the sponge dough for 2 min. at low speed and for 6 min. at medium speed. |
| Temperature of mixing | 27° C. |
| Floor time | 40 min. |
| Division | 40 g piece |
| Bench time | 15 min. |
| Molding | Degassed and rounded |
| Freezing | Rapid freezing (−40° C. 30 min.) |
| Storage | −18° C. |

COMPARATIVE EXAMPLES 1-3

The frozen doughs for butter rolls were prepared in the same manner as illustrated in Example 1, but using as the emulsifier those shown in Table 1 below.

TABLE 1

| | Comparative Example 1 | Comparative Example 2 | Comparative Example 3 |
|---|---|---|---|
| Emulsifier | Distilled monoglyceride | Soybean lecitin | Sucrose fatty acid ester |
| HLB | 3.7 | 1.5 | 18 |

COMPARATIVE EXAMPLES 4-5

The frozen doughs for butter rolls were prepared in the same manner as illustrated in Example 1, but controlling the temperature of the treated solution as shown in Table 2 below.

TABLE 2

|  | Comparative Example 4 | Comparative Example 5 |
|---|---|---|
| Temperature of treated solution (°C.) | 55 | 20 |

TESTING 1

Frozen doughs for butter rolls prepared in Example 1 and Comparative Examples 1–3, respectively, were stored frozen for 1 to 10 week(s). Samples were withdrawn in the 1st, 3rd, 5th, 7th and 10th week, and processed thereafter as the following to make final products, namely butter rolls. Qualitative comparison of these products is shown is Table 4.

| Step | Operation |
|---|---|
| Thawing and final proof | Frozen dough pieces were placed on baking sheet pan and kept in a fermentation chamber at 32° C. and 78% relative humidity. |
| Baking | 210° C. for 10 min. |

Notes:
(1) To judge the end point of final proof, 150 g each of the doughs prepared in Examples and Comparative Examples were molded in rolls, stored frozen, and panned in 490 cc one-loaf pans, thawed and proofed as described above; end of final proof was judged at the time when top surface of the dough has reached the upper end of one-loaf pan.
(2) Scoring was made according to the criteria shown in Table 3.
(3) Testing was carried out by a panel of 25 tasters; scoring was made by 4-point choice on eating quality and flavor.

TABLE 3

Criteria for scoring the bread quality

| | Rating | Features |
|---|---|---|
| Appearance | A | Crust is well expandable; color is uniform and sheeny. |
| | B | Crust is a little expandable; color is less uniform but somewhat sheeny. |
| | C | Crust is not expandable; color is not uniform without sheen. |
| Grain | A | Uniform and thin cell walls |
| | B | Less uniform but thin cell walls |
| | C | Not uniform and thick cell walls |
| Crumb texture | A | Very soft |
| | B | Soft |
| | C | Not soft |

TABLE 4

| | Storage period | Volume of bread (cc) | Appearance | Grain | Crumb texture | Number of tasters who judged good |
|---|---|---|---|---|---|---|
| Bread product from a frozen dough according to Example 1 | 1 week | 220 | A | A | A | 8 |
| | 3 weeks | 230 | A | A | A | 9 |
| | 5 weeks | 225 | A | A | A | 25 |
| | 7 weeks | 220 | A | A | A | 25 |
| | 10 weeks | 225 | A | A | A | 25 |
| Bread product from a frozen dough according to Comparative Example 1 | 1 week | 220 | A | A | A | 7 |
| | 3 weeks | 220 | A | A | B | 5 |
| | 5 weeks | 205 | B | B | B | 0 |
| | 7 weeks | 190 | C | C | B | 0 |
| | 10 weeks | 175 | C | C | C | 0 |
| Bread product from a frozen dough according to Comparative Example 2 | 1 week | 225 | A | A | A | 6 |
| | 3 weeks | 220 | A | A | A | 6 |
| | 5 weeks | 200 | B | B | B | 0 |
| | 7 weeks | 185 | C | C | C | 0 |
| | 10 weeks | 170 | C | C | C | 0 |
| Bread product from a frozen dough according to Comparative Example 3 | 1 week | 220 | A | A | A | 4 |
| | 3 weeks | 215 | A | A | B | 5 |
| | 5 weeks | 195 | B | C | B | 0 |
| | 7 weeks | 180 | C | C | C | 0 |
| | 10 weeks | 165 | C | C | C | 0 |

TESTING 2

Frozen doughs for butter rolls prepared in Example 1 and Comparative Examples 4–5, respectively, were stored frozen for 1 to 10 week(s). Samples were withdrawn in the 1st, 3rd, 5th, 7th and 10 week, and processed in the same manner as mentioned in Testing 1 to make final products, namely butter rolls. Qualitative comparison of these products is shown in Table 5.

To judge the end point of final proof and to evaluate the quality of the bread, the method mentioned in Testing 1 was used.

TABLE 5

| | Storage period | Volume of bread (cc) | Appearance | Grain | Crumb texture | Number of tasters who judged good |
|---|---|---|---|---|---|---|
| Bread product from a frozen dough according to Example 1 | 1 week | 220 | A | A | A | 10 |
| | 3 weeks | 230 | A | A | A | 12 |
| | 5 weeks | 225 | A | A | A | 21 |
| | 7 weeks | 220 | A | A | A | 23 |
| | 10 weeks | 225 | A | A | A | 24 |
| Bread product from a frozen dough according to Comparative Example 4 | 1 week | 220 | A | A | A | 8 |
| | 3 weeks | 225 | A | A | A | 9 |
| | 5 weeks | 205 | A | B | B | 4 |
| | 7 weeks | 195 | B | B | B | 2 |
| | 10 weeks | 190 | B | B | B | 1 |

TABLE 5-continued

|  | Storage period | Volume of bread (cc) | Appearance | Grain | Crumb texture | Number of tasters who judged good |
|---|---|---|---|---|---|---|
| Bread product from a frozen dough according to Comparative Example 5 | 1 week | 225 | A | A | A | 7 |
|  | 3 weeks | 210 | A | B | A | 4 |
|  | 5 weeks | 200 | B | B | B | 0 |
|  | 7 weeks | 185 | B | C | C | 0 |
|  | 10 weeks | 165 | C | C | C | 0 |

TESTING 3

Frozen doughs for butter rolls prepared according to Example 1 and Comparative Example 1, respectively, were stored frozen for 1 to 10 week(s). Samples were withdrawn in the 1st, 3rd, 5th, 7th and 10th week, and processed in the same manner as mentioned in Testing 1 to make final products, namely butter rolls. The time lengths required from starting thawing to completion of final proof are shown in Table 6.

To judge the end point of final proof, frozen doughs were packed in 1,700 cc one-loaf pans and kept in chamber for final proof (30° C., 78% relative humidity). End point was judged at the time when top surface of the dough has reached upper end of the one-loaf pan.

TABLE 6

| Storage period | Time length (min.) required from starting thawing to completion of final proof | |
|---|---|---|
|  | Dough of Example 1 | Dough of Compa. Example 1 |
| 1 week | 92 | 101 |
| 3 weeks | 94 | 109 |
| 5 weeks | 90 | 125 |
| 7 weeks | 92 | Not measured |
| 10 weeks | 92 | Not measured |

What we claim is:

1. A process of producing a frozen yeast fermented dough which comprises the steps of:
   (a) emulsifying the total amount of water required for a dough formulation with oil or fat required for the dough formulation in the presence of a nonionic emulsifier having the HLB value of 6 to 17, at a temperature of about 25° to 50° C.,
   (b) mixing the emulsified solution of step (a) with the rest of ingredients of the dough formulation to prepare a dough,
   (c) fermenting the dough,
   (d) dividing said fermented dough,
   (e) molding each portion of the fermented dough into the desired shape, and
   (f) freezing the dough to prepare a frozen dough.

2. The process set forth in claim 1 wherein the dough formulation comprises wheat flour, water, yeast, salt, sugar, oil or fat.

3. The process set forth in claim 2 wherein step (a) is carried out together with dough ingredients other than wheat flour, yeast and salt.

4. The process set forth in claim 1 wherein the emulsifier is sucrose fatty acid ester.

* * * * *